United States Patent Office 3,354,212
Patented Nov. 21, 1967

3,354,212
PROCESS FOR REDUCING AROMATIC AND CYCLOALIPHATIC NITRO COMPOUNDS
Lorraine G. Donaruma, Media, Pa., assignor to E. I. du Pont de Nemours and Company, Wilmington, Del., a corporation of Delaware
No Drawing. Filed Nov. 9, 1961, Ser. No. 151,205
10 Claims. (Cl. 260—566)

This invention relates to a process, and more particularly to an improvement in the process for changing the state of oxidation of chemical compounds by reaction with metallic redox agents.

Redox reactions of chemical compounds with metallic redox agents, that is, oxidation and reduction reactions employing metallic oxidizing or reducing agents, are some of the most widely known and used reactions in chemistry. One example of such reactions is the reduction of nitrobenzene to aniline in the presence of ferrous chloride according to the equation:

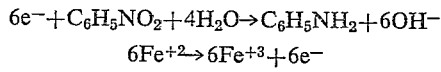

$$6Fe^{+2} \rightarrow 6Fe^{+3} + 6e^{-}$$

Other examples include the reduction of potassium aurocyanide to gold in the presence of zinc, the reduction of chromic oxide to chromium in the presence of aluminum and the cleavage of vic-glycols to aldehydes in the presence of lead tetraacetate.

Although oxidation and reduction with metallic oxidizing and reducing agents, that is, metallic redox agents, are often rapid and efficient, loss of the metallic oxidizing or reducing agents, for example, because of the difficulty or expense of recovery, often makes such reactions with metallic redox agents commercially unattractive. Thus, the art has turned, for example, to catalytic hydrogenation as an alternative to metallic reduction or, for example, to the use of such agents as hydrogen peroxide or nitric acid as oxidizing agents. These alternatives, however, are not free from other problems. Thus, for example, catalytic hydrogenation is frought with problems of catalyst poisoning with sulfides, amines, and the like. Hydrogen peroxide is irretrievably lost by conversion to water. Nitric acid yield $N_2O$ which not only is noxious but effectively retards or halts the oxidizing reaction.

The subject invention provides an improvement in conventional redox reactions employing conventional metallic redox agents. The improvement provided by the subject invention relates to the means by which the metallic redox agents are introduced into the aforementioned known redox system, namely, in the form of a polymeric chelate. The improvement provided in accordance with this subject invention makes it possible to recover the redox agents usually with little or no loss thereof and in a form eminently suited for regeneration. Thus, the instant invention opens wide areas for the commercial utilization of known redox reactions employing metallic redox agents.

Concisely stated, the instant invention relates to an improvement in redox reactions employing metallic redox agents wherein the reaction is accompanied by a change in the valence state of the metal comprising the agent, which improvement comprises providing said metal as a chelate of a chelate-forming polymer.

The polymeric portion of the redox agent-chelate-forming polymer complex employed in the process of this invention serves primarily as the backbone for the retention of the metal atoms which act as the oxidizing or reducing agent and which are bonded to the polymer molecules as members of chelate rings. The polymer portion of the chelate complex does not enter directly into the reaction and can be any polymer composition which is inert with respect to the system in which it is employed, and preferably insoluble therein, and which has at least one, and preferably recurring, metal chelate-forming groups or structures. A chelating, or chelate-forming, structure is one which contains at least two two donor groups so located with respect to one another that they form a chelate ring with a metal atom. These donor groups are well-known and recognized in chelate chemistry. The most important and preferred donor groups, and consequently the chelate-forming structure, are those which contain oxygen, sulfur, or nitrogen as donor atoms. The principal groups containing such atoms are carboxy, —COOH; sulfo, —SO₃H; enolic hydroxyl, alcoholic hydroxyl, and phenolic hydroxyl, —OH; carbonyl, =CO; primary amino, —NH₂; secondary amino, —NHR; tertiary amino, —NR₂; cyclic tertiary amino, =N—; thio, —S—; imino, =NH; substituted imino, =NR; hydroxyimino, =NOH and thiohydroxy or mercapto, —SH. As is known, some of these groups form covalent bonds (of varying degrees of ionic character) and others form coordinate bonds with metal atom in the formation of the chelate rings. The valence bonds of the metal in the chelates can be all covalent, or all coordinate, or mixed. In the chelated polymers, the metal atoms are usually in a positive valence state, that is, in the form $Me^{+n}$ where $n$ is a positive integer.

Polymers having pendent donor atoms are particularly preferred because of their ease of preparation and the reactivity of th emetal atoms in chelates formed therewith. Also, preferably, because of the stability of the chelates formed therewith, polymers forming five and six membered chelate rings are preferred, although polymers forming chelate rings of four or seven, eight, or higher membered rings can also be employed. Vinyl addition and formaldehyde condensation polymers fulfilling the aforementioned requirements form a particularly preferred group of polymeric materials employed in forming the chelates used in this invention. Usually the polymerized moieties contributing the donor groups constitute, for example, 25% or more mole percent of the polymers.

Eaxmples of polymeric materials of high molecular weight (addition or condensation polymers) having at least one, but generally a larger number, of chelating structures are the tropolone-formaldehyde polymers; salicylic acid-formaldehyde polymers; resorcyclic acid-formaldehyde polymers; polythiosemicarbazides; substituted styrene polymers such as those containing aliphatic aminocarboxylic acid groups (U.S. Patents 2,875,162, 2,888,-441, 2,910,445); polymeric 1,2-dioximes and 1,2-ketooximes of U.S. Patent 2,620,325; polyhydroxamic acids; the condensation products of salicylaldehyde with polymeric primary amines (U.S. Patent 2,634,253); polyethyleneimine, the polymeric alkyl 3-keto-4-pentenoates (U.S. Patent 2,647,106); the esters of hydroxyl-containing polymers such as polyvinyl alcohol; hydrolyzed ethylenevinyl acetate polymers; cellulose; cellulose esters; cellulose ethers; polyester resins having free hydroxyl groups and the like with acyclic or cyclic β-keto acids such as acetoacetic acids or 2-carboxycyclopentanone or β-diketo acids such as α-benzoylacetoacetic acid, α-acetylacetoacetic acid or 4-carboxy-5,5-dimethylcyclohexane-1,3-dione; the polymers and copolymers of vinyl salicylate or allyl salicylate, e.g., ethylene-vinyl salicylate, ethylene-allyl salicylate, ethylene-vinyl salicylate-vinyl acetate copolymers; the vinyl acetate-vinyl salicylate, vinyl chloride-vinyl salicylate and vinyl fluoride-vinyl salicylate copolymers; poly-p-acetoacetylstyrene; polymethacrylylacetone; the polymers and copolymers of β-ketoesters of p-vinylbenzyl alcohol or 2-cyanoallyl alcohol; polyester resins from glycols such as hexamethylene glycol or decamethylene glycol and chelate-forming dicarboxylic acids such as acetone dicarboxylic acid, methylenedisalicyclic acid or 4-hydroxyisophthalic acid (1,3-dicarboxy-4-hydroxybenzene); and copolymers of monohydric o-acrylylphenols and one or more other ethylenically unsaturated, polymerizable monomers (U.S. Patent 2,961,426).

As shown in the examples, in accordance with this invention, monovalent metals such as silver can be employed, for example, in oxidation reactions. However, because they are easier to regenerate and because the chelates formed therewith are usually more stable in both their oxidized and reduced valence state, variable valence metals, particularly of Groups 3, 4, 5, 6, 7 and 8 of the Periodic Table, are preferred. Of the variable valence metals, those having at least one ionic valence state of 2 to 4, that is, those wherein the metal can be present as $Me^{+2-4}$, are particularly preferred. Examples of metals which can be employed in the process of this invention are silver, titanium, vanadium, chromium, maganese, iron, copper, nickel, cobalt, uranium, molybdenum, lead, tin, mercury, cesium, palladium, platinum, tungsten, thallium, europium, praseodymium, cerium, terbium, and ytterbium and mixtures thereof. Of course, the aforementioned metals can be employed in one or several valence states depending upon the redox reaction in which they are employed. Because of their ready availability, the ease of preparation and stability of chelates thereof, and the electrode potential of the various valence states thereof, copper, tin, and iron are particularly preferred. Because of their cost, versatility and reactivity, salicylic acid-formaldehyde polymers chelated with iron, either as $Fe^{+2}$ or $Fe^{+3}$, are an especially preferred group of polymeric chelates used in this invention. Polyvalent chelatable metals such as those above and others which can be employed in the subject invention are shown, for example, by Martell and Calvin in "Chemistry of the Metal Chelate Compounds," Prentice Hall, Inc., New York, N.Y. (1952), particularly page 182.

Depending upon the coordination number of the particular metal used in the polymeric chelates employed in the process of this invention, the metal atom may be associated with 1, 2, 3, and theoretically even 4 chelate rings. Polymeric chelates in which each metal atom is associated with an average of 1 to 3 chelate rings, that is, in which the metallic redox agent is chelated with an average of 1 to 2 pairs of donor groups from the polymeric backbone, are preferred. Preferably, at least about 50% of the available donor groups in the polymeric backbone are chelated, that is, the polymer is at least about 50% saturated. Saturation can be determined by reacting a sample of the chelatable polymer with an excess of the metallic redox agent and determining the extent of further reaction.

The choice of the particular metal to be used in any particular case depends upon several factors including whether an oxidation or reduction reaction is to be carried out, the electrode potential of the particular reaction of the material to be oxidized or reduced, and the electrode potential of the chelated metal pair. When the metal chelate polymer is usd as an oxidant, the metal will pass from a higher valence state to a lower state, perferably to its lowest positive ionic valence state. When the metal chelate polymer is used as a reductant, the metal will pass from a lower valence state, preferably its lowest povitive ionic valence state, to a higher state. For example, $Fe^{+2}$ can be used as a reductant while $Fe^{+3}$ can be used as an oxidant. The electrode potential of a chelated metallic redox agent is dependent upon the standard potential of the metal pair, that is, the metal in its oxidized and reduced form, and to a somewhat lesser extent, upon the electronic and steric environment of the metal in the polymer backbone. In general, a metal couple having an electrode potential favoring the desired reaction is first selected. As a first estimate, the suitability of a particular couple for the desired reaction can be determined from conventional tables of standard potentials for the unchelated metal. If the chelated metal does not promote the reaction in question to the desired extent, for example, because of the influence of the polymer backbone, the reaction can be promoted in the conventional way, for example, by heating, decreasing the concentration of products, adjusting the pH, or alternatively, by selecting a metal pair with a greater standard potential. Of course, the extent of reaction will be most complete for chemical interactions having the greatest difference in standard electrode potential. The effect of various chelating agents on metal ions in solution is discussed in several standard reference works, for instance, Martell and Calvin, "Chemistry of Metal Chelate Compounds," Prentice Hall, Inc., New York, N.Y., pages 55–60 (1952).

As illustrated more fully hereinafter, the metal chelate polymers employed in this invention can be used as reductants or oxidants of both organic and inorganic compounds. The chelated metallic redox agent need only be contacted with material to be oxidized or reduced and reaction occurs. In general, the reaction conditions, such as temperature and the like, employed for the particular redox reaction when unchelated metal is used, can be used in the process of this invention, although, because of the influence of the polymeric portion of the chelate, adjustments in reaction conditions such as those mentioned hereinbefore may be desirable for optimum results. In one preferred embodiment of this invention, the polymeric chelate and material to be oxidized or reduced are reacted in a fluid liquid medium such as water, dioxane; primary and secondary 1–12 carbon unsubstituted alkanols, e.g., methanol, ethanol, propanol, butanol, etc. (tertiary alcohols are easily hydrated under the reaction conditions and are not suitable); aromatic hydrocarbons, e.g., benzene, toluene, xylene, cumene, cymene, pseudocumene; ethers, e.g., ethyl ether, tetrahydrofuran, and chlorodiethyl ether; tertiary amines, e.g., pyridine, trimethylamine, and quinuclidine; halogenated lower hydrocarbons, e.g., carbon tetrachloride, and, when the redox reaction is effected at a pH less than 9, ketones, such as acetone, methyl ethyl ketone, and methyl isobutyl ketone. Aqueous solutions of the aforementioned organic solvents are also suitable as the liquid media. Of course, the particular liquid medium used must be a nonsolvent for the polymer backbone, and will depend also on the type of redox reaction occurring and the conditions of the reaction. The material to be oxidized or reduced can be either dissolved or dispersed in such liquid medium. In order to facilitate ease of recovery of the polymeric chelate, preferably the polymeric redox agent is insoluble in such medium. Another preferred embodiment is to pass a liquid medium comprising the material to be oxidized or reduced through a bed or column of the polymeric chelate.

The following illustrates various types of oxidation and reduction reactions which can be carried out in accordance with the instant invention.

| Reactant | | Product |
|---|---|---|
| R—CHO | Oxidation | R—COOH |
| R—CHO | Reduction | R—CH$_2$OH |
| R—SH | Oxidation | R—S—S—R |
| RNO$_2$ | Reduction | |
| (1) Primary and secondary nitro | | RNOH |
| (2) Tertiary | | RNH$_2$ |
| RNO | Reduction | RNH$_2$ |
| | Oxidation | R—NO$_2$ |
| RNHOH | Reduction | R—NH$_2$ |
| | Oxidation | RNOH |
| RN=NR | Reduction | R—NH—NH—R |
| | Oxidation | R—N=NR |
| M$^{+n}$ | | M ↓ O |
| M$^{+n}$ | | M$^{(n+x)}$ |
| M$^{+n}$ | | M$^{(n-x)}$ |
| H$_2$ | | H$^+$ | wherein the R groups are organic radicals such as aliphatic, aromatic or heterocyclic radicals and M is a metal or non-metal of valence state $n$ which undergoes a change in valence state $x$. Of course, as indicated hereinbefore, the conditions under which the above reactions are effected, are dependent upon the particular reactant and upon the particular metal chelate polymer used. If a reactant contains more than one oxidizable or reducible functional group, either one or the other or both of the groups may react with the metal chelate polymer, depending upon the electrode potentials of each of the oxidation-reduction couples. By proper choice of the metal chelate polymer, such reactions can be carried out selectively. With regard to those reactions employing the M-designations, M can be free in solution or bound in the form of a complex anion or cation. For instance, Mn(VII) as in permanganate ($MnO_4^-$) can be reduced in accordance with this invention to $Mn^{+2}$; S(IV) as in $SO_3^=$ or $SO_2$ can be readily oxidized to S(VI) as in $SO_4^=$; Ag(I), Pd(II), Au(III), Pt(IV) and Pt(II) can be reduced to the free metals; Br(VII) as in $BrO_3^-$ can be reduced to Br(I); Hg(II) can be reduced to Hg(I); etc.

Typical of the organic redox reactions indicated above are: the oxidation of aldehydes such as butyraldehyde; acetaldehyde; isovaleraldehyde, pivaldehyde, 2,2 - diphenylpropionaldehyde, benzaldehyde, p-tolualdehyde, α-naphthaldehyde, furfural, crotonaldehyde, acrolein, etc. to the corresponding acids; reduction of aldehydes such as benzaldehyde and pivaldehyde to the corresponding alcohol; reduction of nitro compounds such as 2-nitrooctane, 2-nitropropane, nitrocyclopentane and phenylnitromethane to the corresponding oximes, and reduction of tertiary nitro compounds such as p-methoxynitrobenzene, m-dinitrobenzene and 2-methyl-2-nitropropane to the corresponding amines. Also, nitroso compounds such as nitrosocyclohexane and trifluoronitrosomethane can be reduced to the corresponding amines or hydroxylamines or can be oxidized to the corresponding nitro compounds. Still other examples are oxidation of cyclohexylhydroxylamine to nitrocyclohexane or to cyclohexanone oxime; oxidation of phenylhydroxylamine to nitroso- or nitrobenzene; and reduction of phenylhydroxylamine to p-aminophenol or aniline. In addition, azobenzene can be reduced to hydrazobenzene or oxidized to azoxybenzene, nitrosobenzene or nitrobenzene, and azoxybenzene can be reduced to azobenzene.

The polymeric metal chelates used in this invention are particularly suitable for the reduction of aromatic, cycloaliphatic, and aliphatic nitro compounds, for instance, the reduction of nitrobenzene to aniline and nitrocyclohexane to cyclohexanone oxime, whereby primary and secondary nitro compounds are reduced to the oxime and the tertiary nitro compounds are reduced to amines. Specifically, for example, in the reduction of nitrocyclohexane, the metal chelate polymers can be contacted with the nitrocyclohexane, for instance, by charging a reaction vessel with nitrocyclohexane and polymer chelate dispersed in water or by passing the nitrocyclohexane through a column of the chelate. A particular advantage of the process of this invention is that crude nitrocyclohexane can be used as the starting material, while by conventional processes a high purity of such reactant is required.

Examples of inorganic reactions which can be carried out in accordance with this invention are reduction of metal ions to the free metal e.g., silver, gold, platinum, palladium, chromium; oxidation of phosphorous acid to phosphoric acid; oxidation of sulfurous acid to sulfuric acid; reduction of potassium ferricyanide to potassium ferrocyanide; oxidation of hydrogen selenide to selenium, and oxidation of $S^{-2}$ to free sulfur.

The amount of metal chelate polymer used can vary considerably. Generally, at least a stoichiometric amount and often up to twice the stoichiometric amount of metal is present for the material to be oxidized or reduced. If desired, less than a stoichiometric amount of the metal can be used, however, in order to keep a practically operating system, under these conditions the metal chelate is regenerated as needed during the reaction. Materials suitable for regenerating the chelate include, for example, hydrogen, air, hydrogen peroxide, sodium sulfite, ascorbic acid, benzoin, aldehydes, radiation sources, or any substance which will alter the valence state of the metal without destruction of the polymer backbone. Where the chelated metallic redox agent is reduced to the zero valence state it can, for example, be regenerated with an aqueous slurry of carbon disulfide.

The subject invention provides a marked improvement in conventional redox reactions employing metallic redox agents. In accordance with this invention, the chelated redox agents are readily recovered. In addition, they are recovered in a form in which they can be readily regenerated. Furthermore, as mentioned hereinbefore, by variation of particular chelated metal or the polymeric backbone chelated therewith, wide variation in electrode potential can be achieved thus permitting great selectivity of reaction.

To more fully illustrate this invention, reference is now made to the following examples in which parts and percentages are by weight.

The tropolone-formaldehyde polymer used in the examples is prepared in the following manner: A mixture containing 12.8 parts of tropolone, 10 parts of 37% formaldehyde, 66 parts of water and 4 parts of sodium hydroxide is refluxed for 2 hours, cooled and allowed to stand at room temperature overnight. Then the pH of the mixture is adjusted to about 5 with acetic acid. The water is decanted and the polymer residue is dissolved in N,N-dimethylformamide. The polymer is reprecipitated by treating the N,N-dimethylformamide solution with a saturated solution of sodium chloride. A yellowish-colored polymer is obtained on drying under vacuum at 60° C. overnight. The polymer has an inherent viscosity of 0.04 in a concentration of 1 part/94 parts of N,N-dimethylformamide at 25° C.

The salicylic acid-formaldehyde polymer used in the examples is prepared as follows: A mixture containing 190 parts of salicylic acid, 13 parts of water, 114 parts of 37% formaldehyde and 1 part of oxalic acid is heated to reflux with stirring for 1 hour and a mixture of 50 parts of 37% hydrochloric acid and 50 parts of water is added. This mixture is then refluxed for 1 hour. Cold water is added and the resin ball is removed and ground. The resin is dried overnight at 80° C. and under 50 mm. pressure. The dry resin is ground further, boiled with 2,000 parts of water and filtered. The resin is dried under vacuum at 80° C. The product is a white solid, insoluble in water and soluble in methanol, which melts at 270–280° C. and then becomes solid again. The molecular weight, as determined by light scattering, is 6700 after two reprecipitations from ethanol with 20% aqueous sodium chloride solution and removal of chloride ion by washing.

The resorcylic acid-formaldehyde polymer used in the examples is prepared in the following manner: A mixture containing 15.4 parts of resorcylic acid, 10 parts of 37% formaldehyde, 10 parts of water, 0.1 part of resorcinol and 0.1 part of oxalic acid is heated to reflux. Violent foaming occurs. A mixture of 5 parts of 37% hydrochloric acid and 5 parts of water is added to the mixture. The mixture turns solid; 50 parts of water is added and the mass is refluxed for 1 hour. The solid product is removed by filtration and cured overnight at 120° C. under 50 mm. of pressure. The dry resin is ground and boiled for 20 minutes with 500 parts of water. The solid is removed by filtration and dried at 120° C. and 80 mm. pressure, yielding 14.6 parts of a pink insoluble, infusible product.

The polythiosemicarbazide polymer used in the examples is prepared as follows: To a solution of 23.2 parts of N,N-diaminopiperazine in 660 parts of dimethyl sulfoxide at about 50° C. is added 56.4 parts of powdered methylene bis(4-phenylisothiocyanate). The mixture rapidly becomes viscous, and heating and stirring is discontinued after about 2 hours. The next day the polymer is isolated by precipitation in water, chopped up in a Waring Blendor, washed thoroughly in water and dried. The yield is quantitative. The product has an inherent viscosity of 1.07 in dimethyl sulfoxide, being measured at 30° C. and a concentration (C) of 0.5, as calculated from the expression $$\eta_{inh} = \frac{\ln \eta_{rel}}{C}$$

wherein $\eta_{rel}$ is the flow time for a dilute solution of the polymer in a capillary viscometer divided by the flow time for the pure solvent.

The poly(4-[bis(carboxymethyl)aminomethyl]styrene) used in the examples is a commercially available material known as Dow-A-1 chelating polymer and sold by Dow Chemical Co., Midland, Michigan.

EXAMPLE 1

*Reduction of nitrobenzene by a tropolone-formaldehyde polymer iron(II) chelate*

To prepare the chelate, 5 parts of the tropolone-formaldehyde polymer was dissolved in N,N-dimethylformamide, and a solution of 2.78 parts of ferrous sulfate heptahydrate in water was added to the N,N-dimethylformamide solution. Fifty parts of water was then added, and the precipitate was centrifuged, washed with water, and suspended in 100 parts of water to which 18 parts of 28% aqueous ammonia was added. Nitrobenzene (0.25 part) was added to the mixture, and the mixture was heated with agitation for one hour on a steam bath. The polymer then was removed by filtration. It had turned brown. The filtrate was extracted with ether and the extract was concentrated. The concentrate then was extracted with three 27.5 part portions of 10% hydrochloric acid. As proof of the formation of aniline, the concentrated acid extract was subjected to diazotization by treatment with sodium nitrite at 0° C. until an excess of nitrous acid was present. The neutralized solution then was treated with 2 parts of β-naphthol dissolved in sufficient 10% sodium hydroxide to raise the pH to 10–11. A red dye precipitated. The infrared spectrum of this material in carbon tetrachloride was identical to that of an authentic sample of phenylazo-β-naphthol.

The equation for the reduction reaction can be represented as:

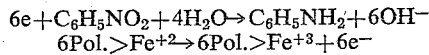

EXAMPLE 2

*Reduction of nitrobenzene by a poly(4-[bis(carboxymethyl)aminomethyl]styrene) tin (II) chelate*

To prepare the chelate, 120 parts of the water-soaked disodium salt of the above polymer was treated with a solution consisting of 13.56 parts of stannous chloride dihydrate in 200 parts of water which had been clarified by the addition of small amounts of concentrated hydrochloric acid. This solution was stirred under a nitrogen atmosphere for approximately one hour. The slightly off-white chelate was removed by filtration under nitrogen and washed well with water. The chelate was then put into a pot with 2.46 parts of nitrobenzene and 90 parts of 28% aqueous ammonia. This mixture was stirred under a nitrogen atmosphere on a steam bath at approximately 95–100° C. for ninety minutes. The entire mixture was then put into a continuous ether extractor and extracted overnight with ether. The polymer color had changed to a light yellow-orange color, which is characteristic of this particular polymeric tin (IV) chelate. The ether extract was then distilled to remove the ether, and the residue was analyzed by infrared analysis to show only aniline contaminated with traces of ether. No nitrobenzene was detected. By actual isolation, the weight of aniline obtained was 1.32 parts or 71% conversion.

EXAMPLE 3

*Reduction of nitrocyclohexane to cyclohexanone oxime by a poly(4-[bis(carboxymethyl)aminomethyl]styrene) iron (II) chelate*

To prepare the chelate, 300 parts of the above water-soaked polymer was saturated with iron (II) by treating the wet polymer with an excess of ferrous sulfate heptahydrate in water. The polymer then was washed free of excess iron with water. The polymer containing the iron then was put into a pot under a nitrogen atmosphere with 164 parts of cyclohexylamine, 200 parts of water, and 24.6 parts of nitrocyclohexane. The mixture was heated with stirring for 35 minutes on the steam bath. After continuous ether extraction of the whole reaction mixture and removal of the ether by distillation, the cyclohexylamine was stripped from the reaction mixture under vacuum. The residue was analyzed by infrared methods for nitrocyclohexane, cyclohexanone, and cyclohexanone oxime. The analysis showed that 1 part of cyclohexanone oxime was present (7% conversion based on iron) and 5.6 parts of nitrocyclohexane was recovered. Under the conditions employed, the polymer contained approximately 9.6 parts of iron. Therefore, the yield based on the iron present in the polymer was 10.1%.

The following runs were made to show the effect of contact time and proportions of reactants on the process of this invention exemplified above. Except as otherwise noted, the materials, proportions thereof and procedure used were those of this example described above:

(a) The contact time was 18 hours. Under these conditions, 3 parts of cyclohexanone oxime was obtained. This corresponded to 31% conversion and 39% yield based on iron.

(b) The contact time was 48 hours. 8.1 parts of cyclohexanone oxime was isolated. This represents an 81.4% conversion, based on iron in the system. The amount of iron present in the system was 10.35 parts.

(c) The contact time was 60 hours. The conversion to the oxime was 43% and the yield was 48%, based on nitrocyclohexane.

(d) 600 parts of the iron (II) chelate polymer, and 126 parts of nitrocyclohexane were used, and the contact time was 16 hours. 23.9 parts of cyclohexanone oxime, 12.6 parts of cylohexanone and 38.8 parts of nitrocyclohexane were recovered.

The iron content in the polymer throughout the above runs remained within the range of about 3.1 to 3.5% based on the weight of polymer.

EXAMPLE 4

*Reduction of nitrocyclohexane by a poly(4-[bis(carboxymethyl)aminomethyl]styrene) tin (II) chelate*

To prepare the chelate, 200 parts of the above polymer was equilibrated with 1000 parts of water containing 22.7 parts of stannous chloride dihydrate for 4 hours under a nitrogen atmosphere. Essentially complete take up of the tin by the polymer resulted. This polymer then was heated to 100° C. for 100 minutes with 1000 parts of water, 164 parts of cyclohexylamine, and 12.6 parts of nitrocyclohexane. After continuous extraction of the mixture with ether overnight, removal of the ether by distillation, and removal of the cyclohexylamine by distillation at reduced pressure, infrared analysis showed the presence of 9.1 parts of cyclohexanone oxime (81% conversion), 1.02 parts of unreacted nitrocyclohexane, and 1.1 parts of cyclohexanone. Only 4% of the tin was lost from the polymer. The used polymer is readily regenerated by treatment with sodium sulfite solution.

When the chelate polymer was prepared as above and a run identical to the above was made, except that 100 parts of the polymer, 11.35 parts of stannous chloride dihydrate, 6.3 parts of nitrocyclohexane, and 82 parts of cyclohexylamine were used, 4.04 parts of cyclohexanone oxime, 0.95 part of unreacted nitrocyclohexane and 0.25 part of cyclohexanone were obtained. The polymer was regenerated by treatment with two molar sodium sulfite solution. The quantity of the sodium sulfite used for each 20 parts of polymer was 25.2 parts. The slurry was stirred for 15 minutes and the sodium sulfite solution was decanted. Fresh sodium sulfite solution then was added, and the stirring was continued for another 15 minutes. Decantation of the solution and recontact with fresh sodium sulfite solution followed to give a total of 75.6 parts of sodium sulfite for every 20 parts of polymer used. The polymer was washed free of sulfite and sulfate ions. The regeneration loss was only 1.6% of the tin.

When a run was made identical to the preceding run except that the regenerated polymer was used, 3.38 parts of cyclohexanone oxime, 1.94 parts of unreacted nitrocyclohexane, and 0.32 part of cyclohexanone resulted.

EXAMPLE 5

*Reduction of nitrocyclohexane by a tropolone-formaldehyde polymer tin (II) chelate*

Nitrocyclohexane (26 parts) was contacted with 100 parts of a tropolone-formaldehyde polymer containing a total of 34 parts of tin in the presence of 164 parts of cyclohexylamine and 1000 parts of water for 2 hours at 100° C. The chelate was prepared by stirring 100 parts of the polymer with 135 parts of stannous chloride dihydrate in 2000 parts of water at pH 2 and washing the chelated polymer to remove physically absorbed tin. The reaction mixture was worked up as in the preceding example to give 9.6 parts of cyclohexanone oxime, 5.9 parts of unreacted nitrocyclohexane, and 0.82 part of cyclohexanone. Tin loss was only 0.1%. This polymer chelate was regenerated as described in Example 4 with a tin loss of only about 3%. Upon recycle of the regenerated polymer chelate and effecting the reaction under identical conditions to the preceding run, 2.5 parts of cyclohexanone oxime, 8.2 parts of unreacted nitrocyclohexane, and 1 part of cyclohexanone were recovered.

EXAMPLE 6

*Reduction of nitrocyclohexane to cyclohexanone oxime in a continuous flow column*

To prepare the chelate, 60 parts of wet poly(4-[bis-(carboxymethyl)aminomethyl]styrene) was stirred under a nitrogen atmosphere with 6.78 parts of stannous chloride dihydrate for an hour at a pH of 1.2. The polymer then was filtered under a nitrogen atmosphere, washed free of excess tin with water, and soaked in a 60/40 (by volume) mixture of cyclohexylamine and water until swelling was complete. This mixture then was poured into a column ½ inch in diameter, and the excess cyclohexylamine-water solution drained down to the top of the resin bed. This gave a column about 18 inches long. This column had a heating jacket through which water at about 70–75° C. was pumped. The polymer contained 2.96 parts of tin. Nitrocyclohexane (3.87 parts) then was dissolved in 46.4 parts of the cyclohexylamine-water mixture and passed through the column at a rate of about 1 part/minute. The column then was washed with 232 parts of the cyclohexylamine-water mixture and then with 50 parts of water. The effluent from the column was extracted continuously overnight with ether. Ether was removed by distillation, and the cyclohexylamine was removed by distillation at reduced pressure. The residue was analyzed to give the following results: 2.5 parts of cyclohexanone oxime (74% conversion), 1.24 parts of unreacted nitrocyclohexane, and 0.27 part of cyclohexanone. There were no detectable tin losses.

A run identical to the preceding run was made except that cyclohexylamine in an amount equimolar to the nitrocyclohexane and an after wash of approximately 4% aqueous cyclohexylamine were used. The oxime was obtained in 59% conversion and the loss of tin was only 5%.

A run identical to the preceding run was made except that "nitrator oil" (organic phase obtained by the liquid-phase nitration by nitric acid of cyclohexane and containing 29.8% nitrocyclohexane in cyclohexane) was used. The oxime was obtained in 44% conversion. Tin loss was only 2%.

When a run identical to the preceding run was made except that 0.1 molar sodium hydroxide was used in place of the cyclohexylamine-water solution, the oxime was obtained in 23% conversion and the loss of tin was only 3%.

When concentrated ammonium hydroxide was used in place of the cyclohexylamine-water solution and the run was made under identical conditions to the penultimate run, a 36% conversion to the oxime resulted and the loss of tin was only 3%.

When a pyridine-water mixture (57/67½ ratio, by volume) was used in place of the cyclohexylamine-water solution and the run was again made, a 24% conversion to cyclohexanone oxime and no tin loss occurred. When a 70/25 (by volume) dioxane-water mixture was used in place of the cyclohexylamine-water mixture and the run was again made, a 24% conversion to cyclohexanone oxime and no tin loss occurred.

EXAMPLE 7

*Reduction of nitrocyclohexane to cyclohexanone oxime by a poly(4-[bis(carboxymethyl)aminomethyl]styrene) copper(I) chelate*

To prepare the chelate, 20 parts of the above wet polymer was stirred with 1.98 parts of cuprous chloride in 100 parts of water. This mixture was stirred at 100° C. with 100 parts of water, 16.4 parts of cyclohexylamine, and 1.3 parts of nitrocyclohexane for a period of 90 minutes. At the end of this time and after the usual work-up of continuous ether extraction overnight, distillation of the ether and analysis of the residue, a 40% conversion to cyclohexanone oxime was obtained.

EXAMPLE 8

*Oxidation of methacrolein to methacrylic acid by a poly (4 - [bis(carboxymethyl)aminomethyl]styrene) copper (II) chelate*

To prepare the chelate, 7000 parts of the above polymer was saturated with copper(II) by stirring with a copper sulfate solution containing excess copper. The polymer was then washed free of copper. The polymer then contained approximately 0.21 part of copper per wet part of initial polymer. This polymer chelate was slurried with 700 parts of methacrolein, 160 parts of sodium hydroxide and with enough water to give reasonable mobility to the mixture for 1 hour and 45 minutes at 25° C. and for 15 minutes at 100° C. The polymer was removed by filtration, washed well with water, and the filtrate acidified with 20% sulfuric acid. The acid solution was extracted continuously with ether overnight. The extract was concentrated and the concentrate distilled. The fraction boiling at 50–90° C. was collected. Gas chromatography showed that methacrylic acid was present in this fraction. This fraction and the undistilled concentrate both gave a positive test for carboxylic acids.

EXAMPLE 9

*Reduction of various inorganic metal ions by a poly(4-[bis - (carboxymethyl)aminoethyl]styrene) tin(II) chelate*

A tin(II) chelate of the above polymer was prepared as previously described and was contacted with a solution of mercuric ions. Mercurous chloride was precipitated from the solution.

When the tin(II) polymer chelate was contacted with a silver nitrate solution, silver metal precipitated on the polymer surface. The silver metal may be recovered by preferential dissolution of the polymer chelate.

EXAMPLE 10

*Regeneration of Sn(IV), Fe(III) and Cu(II) containing polymers*

Equilibration of poly(4 - [bis(carboxymethyl)aminomethyl]styrene) (polymer described in the preceding examples) with excess stannic chloride yielded a tin(IV) chelate which contained 0.386 part of tin(IV) per 10 parts of dry polymer. Reduction of this material with hydrogen at 200–238° C. for 4 hours with a hydrogen flow of 1.24 liters per hour gave 91% reduction of the tin(IV) polymer to a tin(II) polymer. The use of poly(4-[bis(carboxymethyl)aminomethyl]styrene) Fe(III) chelate containing 0.42 part of iron for 10 parts of polymer in place of the tin chelate at 200–238° C. for 4 hours resulted in a 62% regeneration to the Fe(II) polymer. Similar results are obtained with Cu(II) chelates.

EXAMPLE 11

*Reduction of nitrobenzene by regenerated poly(4-bis(carboxymethyl)aminomethyl styrene) tin(II) chelate*

When 10 parts of the tin (II) polymer obtained by regeneration of the Sn(IV) polymer as described in the first run of Example 10 was contacted with nitrobenzene, a 91% conversion to aniline was obtained in one experiment and 100% conversion to aniline was obtained in a second experiment. The conditions used for the nitrobenzene reduction were identical to those employed in Example 2 except for the use of the regenerated polymer.

EXAMPLE 12

*Oxidation of ascorbic acid by a tropolone-formaldehyde iron(III) chelate*

Three 5 part samples of a tropolone-formaldehyde iron(III) chelate (prepared by dissolving the tropolone-formaldehyde polymer in the minimum amount of N,N-dimethylformamide, adding a concentrated aqueous solution of ferric nitrate such that there is surplus iron, precipitating the chelate by the addition of water and washing free of absorbed iron) were placed in three separate containers. One sample was covered with 1000 parts of degassed water ($O_2$ removed); the other two samples were covered with 1100 parts of a solution of 200 parts of ascorbic acid in 2000 parts of degassed water. The three samples were allowed to remain in a dry box overnight (in a nitrogen atmosphere). The polymeric material was filtered from each of the solutions and washed well with water. The oxidation product was identified as dehydroascorbic acid.

To remove the iron from the polymer to determine the extent of reduction thereof, the polymeric materials were each added to separate 1139 part portions of a 20% sulfuric acid solution. Each mixture was allowed to stand for two days after which the polymeric material was filtered from the solutions. Each filtrate was titrated with 0.1 N potassium permanganate solution. The filtrates required 0.13 part and 0.14 part to reach the end point (30-second period); the blank required 0.007 part to reach the end point.

EXAMPLE 13

*The oxidation of propionaldehyde by a polythiosemicarbazide silver(I) chelate*

The silver(I) chelate of polythiosemicarbazide was prepared by equilibration of 100 parts of wet polythiosemicarbazide with a solution of 25 parts of silver nitrate in 200 parts of cold water which was made basic with concentrated ammonium hydroxide until the precipitate formed dissolved. After filtration and washing with water the chelate polymer analyzed for 13.8% silver. Twenty parts of the chelate polymer was placed in the cup of a Soxhlet extractor and 300 parts of propionaldehyde was refluxed through the extractor overnight. At the end of this time, the excess propionaldehyde was recovered by distillation and the residue analyzed for propionic acid by vapor phase chromatography. Propionic acid (9.032 parts) was present and 242.4 parts of propionaldehyde was recovered.

EXAMPLE 14

*Oxidation of isovaleraldehyde by a polythiosemicarbazide copper(II) chelate*

The copper chelate of polythiosemicarbazide was prepared by stirring 5000 parts of polythiosemicarbazide with an ammoniacal solution of 750 parts of copper sulfate in 13,500 parts of water. After filtration and washing with water the polymer chelate analyzed for 0.32 part of copper/part of wet polymer. The polymer chelate (40 parts) was mixed with 8.6 parts of isovaleraldehyde, 1.7 parts of silver nitrate and 5 parts of sodium hydroxide. To this mixture was added enough water to obtain a reasonable stirring rate. After stirring for 90 minutes on a steam bath under a nitrogen atmosphere, the reaction mixture was acidified and continuously extracted with ether overnight. Titration and infrared analyses indicated that 1.5 parts (15% conversion) of isovaleric acid was obtained.

By following the same procedure as above but with the reaction being allowed to proceed overnight, 2.09 parts (20% conversion) of isovaleric acid was obtained.

EXAMPLE 15

*Oxidation of isovaleraldehyde by a polythiosemicarbazide silver(I) chelate*

Twenty parts of the silver chelate of polythiosemicarbazide prepared as previously described in Example 13 was mixed with 0.86 part of isovaleraldehyde, 9 parts of of 28% aqueous ammonia and enough water to obtain a reasonable stirring rate. Heating this mixture on the steam bath under nitrogen for 90 minutes followed by the isolation procedure previously described in Example 14 gave 0.236 part (23% conversion) of isovaleric acid. By repeating the same procedure except that the mixture was heated overnight on the steam bath, a 10% conversion to isovaleric acid was obtained.

EXAMPLE 16

*Reduction of nitrobenzene by a resorcylic acid-formaldehyde polymer uranium(IV) chelate*

Twenty-two parts of the resorcylic acid-formaldehyde polymer containing 5.91% of chelated U(IV) (prepared by contacting the polymer with an aqueous solution of uranyl nitrate at pH 3 and washing free of excess $UO_2^{++}$) was mixed with one part of nitrobenzene and 450 parts of 28% aqueous ammonia. This mixture was heated on the steam bath under nitrogen with stirring for two and one-half hours, cooled and extracted continuously overnight with ether. The ether was removed from the extract by distillation and, upon infrared analysis, the residue was shown to contain 0.1125 part of aniline and 0.65 part of nitrobenzene.

EXAMPLE 17

*Reduction of Ag(I) by a salicylic acid-formaldehyde polymer Fe(II) chelate*

Three hundred twenty parts of salicylic acid-formaldehyde polymer was dissolved in 200 parts of ethanol and adjusted to pH 8. A solution of 280 parts of ferrous sulfate hptahydrate in 900 parts of water was added to the polymer solution. After stirring the mixture under nitrogen until absorption was complete, the chelate polymer was removed by filtration and washed with water. The wet chelate polymer analyzed for 0.29 part of iron/part of wet polymer. The color of the ferrous chelate was a dark brown-black. The chelate was stirred for three hours with a 0.1 N silver nitrate solution (26.8 parts Ag(I)). The color of the polymer chelate changed to the blue color characteristic of the salicylic acid-formaldehyde polymer Fe(III) chelate. At the end of this time, the reaction mixture was filtered and the filter cake washed with water. The filtrate was acidified with concentrated nitric acid and dilute hydrochloric acid added to precipitate any unreduced silver as silver chloride. The precipitate was digested, removed by filtration in a Gooch crucible to yield 2.407 parts (1.8 parts Ag(I)) of silver chloride.

EXAMPLE 18

*Reduction of silver(I) with Sn(II) chelates of salicylic acid-formaldehyde polymer and resorcylic acid-formaldehyde polymer*

One hundred parts of resorcylic acid-formaldehyde polymer sodium salt was stirred with a solution of 200 parts of stannous chloride dissolved in water. After equilibration for one hour under nitrogen, a polymeric chelate was obtained which contained the equivalent of 2.21 parts of Sn(IV) oxide/part of wet polymer. The chelate was then stirred with a 0.1 N silver nitrate solution (28.4 parts Ag(I)). After a work-up procedure identical to that of Example 17, 0.57 part of silver chloride (0.43 part Ag(I)) was obtained. When the salicylic acid-formaldehyde polymer was used in place of resorcylic acid-formaldehyde polymer under the same conditions, a chelate was obtained which analyzed for 0.44 part of Sn(IV)/part of wet polymeric chelate. This material upon equilibration with a 0.1 N silver nitrate (7.2 parts (Ag(I)) gave quantitative reduction of Ag(I) to the free metal.

EXAMPLE 19

*Oxidation of resorcylic acid-formaldehyde polymer Fe(II) chelate with permanganate*

One hundred parts of the resorcylic acid-formaldehyde polymer Fe(II) chelate was prepared by equilibrating the resorcylic acid-formaldehyde polymer sodium salt with an aqueous solution of ferrous sulfate at about pH 3 and washing free of absorbed iron to give a polymeric chelate analyzing for 0.47 part of iron oxide/part of wet polymer. Treatment of this material with potassium permanganate solution caused discoloration of the supernatant liquid containing the permanganate color with concurrent oxidation of the Fe(II) chelate to the Fe(III) chelate.

EXAMPLE 20

*Oxidation of cinnamaldehyde by a poly(4-[bis(carboxymethyl)aminomethyl]styrene) copper(II) chelate*

One hundred parts of the above chelate polymer containing 12.6 parts of copper(II) and prepared as in Example 8 was mixed with 13.2 parts of cinnamaldehyde, 500 parts of water, 110 parts of sodium hydroxide and 160 parts of ethanol. The mixture was heated with stirring under nitrogen for 24 hours. The mixture was acidified with 20% sulfuric acid and continuously extracted with ether overnight. The ether extract was extracted with 10% aqueous sodium carbonate, the carbonate extract was acidified and extracted with ether. The solvent was removed by distillation and a residue remained which, by infrared analysis and titration, was analyzed to contain 0.495 part of cinnamic acid.

EXAMPLE 21

*Oxidation of cinnamaldehyde by a poly(4-[bis(carboxymethyl)aminomethyl]styrene) copper(II) chelate*

By carrying out the reaction under identical conditions to Example 20 except that 40.6 parts of a 2% silver nitrate solution was added to the reaction mixture, employing an identical work-up procedure, 14.4 parts of cinnamic acid was indicated to be present by titration with standard sodium hydroxide. Extraction of the basic titrated solution with ether followed by saturation with sodium chloride and acidification yielded 7 parts of cinnamic acid. The infrared spectrum of this material was identical to that of an authentic sample of cinnamic acid.

EXAMPLE 22

*Oxidation of furfural by a poly(4-[bis(carboxymethyl)aminomethyl]styrene) Cu(II) chelate*

When the procedure of Example 21 was repeated except that cinnamaldehyde was replaced with an equimolar quantity of furfural, a crude product resulted which analyzed, by titration, for 9.04 parts of pyromucic acid. Extraction of the basic titration solution with ether followed by acidification, extraction with chloroform, removal of the chloroform, and recrystallization of the residue from water yielded 3 parts of crystalline pyromucic acid which had an infrared spectrum comparable to that of an authentic sample of pyromucic acid.

In Example 23, the overall reduction can be viewed as the simultaneous reduction of the nitrobenzene and regeneration of the Sn(II) chelate polymer which is oxidized to Sn(IV) chelate polymer.

EXAMPLE 23

*Catalytic reduction of nitrobenzene to aniline by a poly (4-[bis(carboxymethyl)amino]styrene) tin(II) chelate*

The chelate was prepared by equilibrating poly(4-[biscarboxymethyl)aminomethyl]styrene) with excess stannic chloride. The polymer was washed free of the excess tin and dried. The dried polymer contained 13.03% tin.

Ten parts of the Sn(IV) polymer chelate was placed in a column and heated to the appropriate temperature. A solution of 12.3 parts of nitrobenzene mixed with 18 parts of 28% aqueous ammonia and 71 parts of dioxane was added dropwise to the catalyst bed over a three-hour period, during which time a flow of 10 liters per hour of hydrogen was passed over the catalyst. The entire mixture was extracted continuously with ether overnight. The ether was removed from the extract and the residue was analyzed for aniline. The results of runs at 100° C. and at 200° C., are given below:

(a) 100° C.—aniline is recovered as acetanilide (0.6 part) by acetylation of the ether residue.

(b) 200° C.—aniline is recovered by acetanilide (0.99 part) by acetylation of the ether residue.

(c) 200° C.—gas chromatographic separation of 0.238 part of aniline is obtained from the ether residue.

The present invention has been described in the foregoing. However, it will be apparent that many variations may be introduced without departure from the scope of the invention. It is intended, therefore, to be limited only by the following claims.

I claim:

1. A process for the reduction of aromatic and cycloaliphatic nitro compounds which comprises contacting said compounds with a chelate of a chelate-forming polymer selected from the group consisting of tropolone-formaldehyde, resorcylic acid-formaldehyde, salicylic acid-formaldehyde and poly(4-[bis(carboxymethyl)aminomethyl] styrene) having a variable valence metal selected from the group consisting of tin, iron, copper and uranium.

2. The process according to claim 1 including the additional step of contacting the metal chelate polymer with a regenerating agent.

3. The process according to claim 2 wherein the regenerating agent hydrogen contacts the metal chelate polymer during the reduction reaction.

4. A process for the reduction of nitrocyclohexane to cyclohexanone oxime which comprises contacting nitrocyclohexane with a chelate of a chelate-forming polymer selected from the group consisting of tropolone-formaldehyde, resorcylic acid-formaldehyde, salicylic acid-formaldehyde and poly(4 - [bis(carboxymethyl)aminomethyl] styrene having a variable valence metal in its lowest positive valence state selected from the group consisting of tin, iron, copper and uranium in the presence of non-solvent for said chelate.

5. The process according to claim 4 wherein the polymer is tropolone-formaldehyde and the metal is tin.

6. The process according to claim 4 including the additional step of contacting the metal chelate polymer with hydrogen during the reduction reaction.

7. A process for the reduction of nitrobenzene to aniline which comprises contacting nitrobenzene with a chelate of a chelate-forming polymer selected from the group consisting of tropolone-formaldehyde, resorcylic acid-formaldehyde, salicylic acid-formeldehyde and poly-(4-[bis(carboxymethyl)aminomethyl]styrene) having a variable valence metal in its lowest positive valence state selected from the group consisting of tin, iron, copper and uranium in the presence of non-solvent for said chelate.

8. The process according to claim 7 wherein the polymer is salicylic acid-formaldehyde and the metal is iron.

9. A process for the reduction of nitrobenzene to aniline which comprises contacting nitrobenzene with a metal chelate polymer comprising a poly(4-[bis(carboxymethyl)aminomethyl]styrene) tin chelate, and passing hydrogen over the polymer chelate thereby effecting regeneration of said chelate.

10. The process according to claim 9 wherein hydrogen is passed over the metal chelate polymer during the reduction reaction.

References Cited
UNITED STATES PATENTS 3,052,515   9/1962   Donaruma _____ 23—14.5

OTHER REFERENCES

Groggins: Unit Processes in Organic Synthesis, pages 85–87 (1952).

Babko: Chemical Abstracts, vol. 40 (1946), 7041 (8).

Helfferich, Ion Exchange, pages 551–557 and 562, McGraw Hill (1962).

CHARLES B. PARKER, *Primary Examiner.*

J. R. LIBERMAN, *Examiner.*

J. C. MARTIN, R. V. HINES, *Assistant Examiners.*